2,991,180
PROCESS FOR THE PREPARATION OF PERFUMED EXTRACTS AND IN PARTICULAR OF POWDERS FROM ALCOHOLS CONTAINING LIQUID AND SUBSTANCES AND PRODUCTS RESULTING THEREFROM

André Faure, 82 rue de Rennes, Paris (VI°), France
No Drawing. Filed June 3, 1958, Ser. No. 739,465
Claims priority, application France June 4, 1957
5 Claims. (Cl. 99—22)

The present invention relates to a method of preparing from alcohol containing liquids and particularly from alcoholic beverages such as rum of perfumed extracts and in particular perfumed powders containing the volatile perfumes. Such powders are of great interest because of the ease with which they can be transported and preserved, and because they can be used either for reforming the alcoholic beverages containing all the aromas by simply adding the powder to ordinary alcohol; or for the preparation of nonalcoholic beverages, for example nonalcoholic mineral waters having substantially the same aroma as the initial alcoholic beverage; or by pastry cooks, sweet makers and cooks; or in various preparations.

It has already been proposed to remove the alcohol from wines, for example by first of all removing the aromatic products in an appropriate solvent such as paraffin and distilling the remainder for the evolution of the alcohol. New distillations were then necessary for the separation of the aromatic products from the solvent separately from the alcohol.

It has also been proposed to use carbohydrates for fixing certain aromas contained in aqueous solutions or decoctions of vegetable substances which are then subjected to a process of dehydration in order to obtain concentrated syrups or even dried extracts.

That process has not given sufficiently good yields to enable it to be applied to alcoholates both because of the absence of precise information as to the conditions under which the aromas when dissolved in the alcohol become fixed by the hydrates and because of difficulties in the separation without appreciable loss not only of the water but also of the alcohol contained in the initial alcoholate containing the aromas.

The research which has led to the present invention has allowed the following to be established.

First of all that the aromas existing in alcoholic liquids and particularly alcoholic beverages can be fixed by carbohydrates without thereby producing any material influence on the methods of separation of the alcohol by distillation or the like.

Secondly that certain carbohydrates and particularly glucose cannot be used as fixing agents because their presence is an obstacle to complete dehydration of the liquids so that even by the use of processes such as lyophilisation dry extracts cannot be obtained.

The process in accordance with the invention consists in adding to an aromatic alcoholic liquid a carbohydrate other than glucose and preferably lactose or levulose followed by separation of the alcohol and the water, preferably in two phases the first by fractional distillation and the second by lyophilisation.

In particular the first operation (fixing of the aromas in the alcoholic liquid by means of carbohydrates) allows the constituents to be brought to a condition favourable for separation by distillation and lyophilisation with a very high proportion of alcohol and water without causing the aromas to be distilled.

The first operation is preferably effected by dissolution in the liquid at a moderate temperature of the order of 30–50° C. of an appropriate sugar. The sugars appear to give the best results are lactose and levulose, glucose being excluded. Very small quantities of these sugars allow a satisfactory fixing of the whole of the aromas in the treated liquid.

Suitable proportions in the treatment of alcoholic beverages such as rum are of the order of magnitude of 1–5% of lactose based on the total quantity of alcohol contained in the beverage, these proportions being variable according to the quantity of the aromas dissolved in the alcohol contained in the beverage.

A single sugar can be used or a mixture of various sugars of the type mentioned above can be used.

In the second operation (by separation of the alcohol by fractional distillation) any appropriate form of apparatus for vacuum distillation can be used. The best results have been obtained by the use of a Desseigne column having 30 plates and equipped with a Delaby separator. This operation can be advantageously continued until the alcohol content is reduced to 6–10°. It can be carried out in accordance with the usual technique for such operations, precautions being taken to ensure that only the alcohol is distilled off.

The third operation consists in subjecting the residual liquid for the preceding operation to lyophilisation that residual liquid contains a remnant of alcohol almost all the water, the added carbohydrates and the aromatic substances fixed on the latter. This operation will be carriedo ut with all the precautions which are essential for the lyophilisation of a liquid having a small alcohol content at very low temperature preferably below minus 30° C. and under a vacuum of at least 0.3 mm. while remaining always above the triple point.

An example of the carrying out of the process will now be given.

(1) 2 gr. of lactose are dissolved to form a 40° solution in 1 litre of 40° rum.

(2) The solution is subjected to fractional distillation under vacuum obtained by means of a water pump acting at the pressure of a normal Towns-water supply.

530 cc. of 81° alcohol and about 470 cc. of a liquid containing alcohol, water, sugar and the various aromatic substances are obtained.

(3) This syrupy liquid is subjected to lyophilisation consisting in freezing to minus 40° C. under a 0.1 mm. vacuum the operation being continued without heating and while remaining always above the triple point until a dry extract is obtained.

The dry residue obtained is a powder containing the lactose and the aromatic substances initially contained in the treated rum.

If pure alcohol (commercial ethyl alcohol) is added to that dry residue, a liquid is reconstituted which has the organoleptic qualities of the initially treated rum.

The present process can be applied not only to rum but to all alcoholic beverages, for examples cognac, armagnac, fruit spirit such as mirabel etc. It can also be applied to liqueurs in which case the sugar initially contained in the treated liquor may suffice for the fixation of the aromas which constitutes the first phase of the present process. It can also be applied to natural or fermented wines.

Finally it can be applied for the production of powdered perfumes from alcoholates containing these perfumes.

I claim:

1. A method of producing a dry extract of the aromatic constituents of an alcoholic liquid containing the same, comprising the steps of mixing an alcoholic-aqueous liquid containing aromatic constituents with at least one carbohydrate other than glucose and being selected from the group consisting of lactose and levulose in an amount of 1–5% of the alcohol content of said alcoholic-aqueous liquid so as to fix the aromatic constituents thereof; subjecting the thus formed mixture to fractional distillation of the alcohol, thereby separating the major portion of the alcohol therefrom; and subjecting the remaining mixture from which the major portion of alcohol has been removed to lyophilisation, thereby removing the remaining alcohol and the water and obtaining a dry extract of said aromatic constituents.

2. A method of producing a dry extract of the aromatic constituents of an alcoholic liquid containing the same, comprising the steps of mixing an alcoholic-aqueous liquid containing aromatic constituents with lactose in an amount of 1–5% of the alcohol content of said alcoholic-aqueous liquid so as to fix the aromatic constituents thereof; subjecting the thus formed mixture of fractional distillation of the alcohol, thereby separating the major portion of the alcohol therefrom; and subjecting the remaining mixture from which the major portion of alcohol has been removed to lyophilisation, thereby removing the remaining alcohol and the water and obtaining a dry extract of said aromatic constituents.

3. A method of producing a dry extract of the aromatic constituents of an alcoholic liquid containing the same, comprising the steps of mixing an alcoholic-aqueous liquid containing aromatic constituents with levulose in an amount of 1–5% of the alcohol content of said alcoholic-aqueous liquid so as to fix the aromatic constituents thereof; subjecting the thus formed mixture to fractional distillation of the alcohol, thereby separating the major portion of the alcohol therefrom; and subjecting the remaining mixture from which the major portion of alcohol has been removed to lyophilisation, thereby removing the remaining alcohol and the water and obtaining a dry extract of said aromatic constituents.

4. A method of producing a dry extract of the aromatic constituents of an alcoholic liquid containing the same, comprising the steps of mixing an alcoholic-aqueous liquid containing aromatic constituents with at least one carbohydrate other than glucose and being selected from the group consisting of lactose and levulose in an amount of 1–5% of the alcohol content of said alcoholic-aqueous liquid so as to fix the aromatic constituents thereof; subjecting the thus formed mixture to fractional distillation of the alcohol until the alcohol content thereof is reduced to a maximum of 10%, thereby separating the major portion of the alcohol therefrom; and subjecting the remaining mixture from which the major portion of alcohol has been removed to lyophilisation, thereby removing the remaining alcohol and the water and obtaining a dry extract of said aromatic constituents.

5. A method of producing a dry extract of the aromatic constituents of an alcoholic liquid containing the same, comprising the steps of mixing an alcoholic-aqueous liquid containing aromatic constituents with at least one carbohydrate other than glucose and being selected from the group consisting of lactose and levulose in an amount of 1–5% of the alcohol content of said alcoholic-aqueous liquid so as to fix the aromatic constituents thereof; subjecting the thus formed mixture to fractional distillation of the alcohol until the alcohol content thereof is reduced to a maximum of 10%, thereby separating the major portion of the alcohol therefrom; and subjecting the remaining mixture from which the major portion of alcohol has been removed to lyophilisation at a temperature below −30° C. and under a vacuum of at least 0.3 mm., thereby removing the remaining alcohol and the water and obtaining a dry extract of said aromatic constituents.

References Cited in the file of this patent

UNITED STATES PATENTS

| | | |
|---|---|---|
| 1,403,473 | Albach | Jan. 17, 1922 |
| 2,019,494 | Jordan | Nov. 5, 1935 |
| 2,696,441 | Kmieciak et al. | Dec. 7, 1954 |
| 2,728,673 | Mouton | Dec. 27, 1955 |
| 2,856,291 | Schultz | Oct. 14, 1958 |